(12) United States Patent
Teillet

(10) Patent No.: US 10,690,230 B2
(45) Date of Patent: Jun. 23, 2020

(54) TRANSMISSION, AND RUNNING VEHICLE EQUIPPED WITH SUCH A TRANSMISSION

(71) Applicant: FRANCE REDUCTEURS, Les Herbiers (FR)

(72) Inventor: Emmanuel Teillet, Les Chatelliers Chateaumur (FR)

(73) Assignee: FRANCE REDUCTEURS, Les Herbiers (FR)

( * ) Notice: Subject to any disclaimer, the term of this patent is extended or adjusted under 35 U.S.C. 154(b) by 57 days.

(21) Appl. No.: 15/573,641

(22) PCT Filed: May 17, 2016

(86) PCT No.: PCT/FR2016/051154
§ 371 (c)(1),
(2) Date: Nov. 13, 2017

(87) PCT Pub. No.: WO2016/185127
PCT Pub. Date: Nov. 24, 2016

(65) Prior Publication Data
US 2018/0119754 A1 May 3, 2018

(30) Foreign Application Priority Data

May 19, 2015 (FR) ..................................... 15 54463
May 19, 2015 (FR) ..................................... 15 54465
(Continued)

(51) Int. Cl.
*F16H 1/10* (2006.01)
*F16H 57/029* (2012.01)
(Continued)

(52) U.S. Cl.
CPC ....... *F16H 57/029* (2013.01); *A01D 34/6806* (2013.01); *A01D 34/6812* (2013.01);
(Continued)

(58) Field of Classification Search
CPC ........ F16H 57/029; F16H 1/20; F16H 57/023; F16H 37/041; F16H 1/10; F16H 1/28;
(Continued)

(56) References Cited

U.S. PATENT DOCUMENTS 5,718,105 A * 2/1998 Irikura ................... A01D 34/69
180/19.1
6,196,367 B1 3/2001 Hanabusa
(Continued)

FOREIGN PATENT DOCUMENTS

DE 1157923 11/1963
DE 1157923 B * 11/1963
(Continued)

OTHER PUBLICATIONS

International Search Report dated Jul. 28, 2016.
(Continued)

*Primary Examiner* — Patrick H MacKey
(74) *Attorney, Agent, or Firm* — Ipsilon USA, LLP

(57) ABSTRACT

A transmission comprising a shaft (6) made as a single piece or as at least two shaft sections (6A, 6B) on a common axis, a "drive toothed" wheel (5) mounted to rotate freely on said shaft (6), and an automatically clutching clutch mechanism (8) arranged between the drive wheel (5) and the shaft (6) or each of the shaft sections (6A, 6B), the or each clutch mechanism (8) comprising: a clutch plate (81) mounted to rotate freely on the associated shaft (6) or shaft section (6A, 6B); a part (82) that is carried by and constrained to rotate with the associated shaft (6) or shaft section (6A, 6B); and a brake of said clutch plate that acts continuously on the angular speed of said plate (81). The brake (83) of the at least one of the clutch plates (81) is threaded on the shaft (6) or the shaft section (6A, 6B) carrying said plate (81).

15 Claims, 17 Drawing Sheets

(30) Foreign Application Priority Data

May 19, 2015 (FR) ...................................... 15 54467
May 19, 2015 (FR) ...................................... 15 54470
May 19, 2015 (FR) ...................................... 15 54471

(51) Int. Cl.

| | |
|---|---|
| *A01D 34/68* | (2006.01) |
| *A01D 34/69* | (2006.01) |
| *F16B 4/00* | (2006.01) |
| *F16B 11/00* | (2006.01) |
| *F16D 43/08* | (2006.01) |
| *F16D 43/20* | (2006.01) |
| *F16D 67/02* | (2006.01) |
| *F16H 1/20* | (2006.01) |
| *F16H 1/28* | (2006.01) |
| *F16H 37/04* | (2006.01) |
| *F16H 57/023* | (2012.01) |
| *A01D 101/00* | (2006.01) |
| *F16D 125/36* | (2012.01) |
| *F16D 125/48* | (2012.01) |
| *F16H 57/02* | (2012.01) |

(52) U.S. Cl.
CPC .............. *A01D 34/69* (2013.01); *F16B 4/004* (2013.01); *F16B 11/006* (2013.01); *F16D 43/08* (2013.01); *F16D 43/20* (2013.01); *F16D 67/02* (2013.01); *F16H 1/10* (2013.01); *F16H 1/20* (2013.01); *F16H 1/28* (2013.01); *F16H 37/041* (2013.01); *F16H 57/023* (2013.01); *A01D 2034/6837* (2013.01); *A01D 2101/00* (2013.01); *F16C 2310/00* (2013.01); *F16D 2125/36* (2013.01); *F16D 2125/48* (2013.01); *F16H 2057/02034* (2013.01)

(58) Field of Classification Search
CPC ............ A01D 34/6806; A01D 34/6812; A01D 34/69; F16B 4/004; F16B 11/006; F16D 43/08; F16D 43/20; F16D 6/02
See application file for complete search history.

(56) References Cited

U.S. PATENT DOCUMENTS

| | | |
|---|---|---|
| 6,354,414 B1 | 3/2002 | Sueshige et al. |
| 6,701,796 B2* | 3/2004 | Blanchard ............... F16H 55/06 192/108 |
| 7,175,012 B2* | 2/2007 | Ruebusch ............... A01D 34/69 192/48.8 |
| 9,456,546 B2* | 10/2016 | Blanchard ............... A01D 34/69 |
| 9,759,300 B2* | 9/2017 | Barendrecht ........... F16D 41/04 |
| 2004/0200316 A1* | 10/2004 | Blanchard ................. F16H 3/14 74/810.1 |
| 2006/0289225 A1* | 12/2006 | Blanchard ............... A01D 34/69 180/337 |
| 2007/0000348 A1* | 1/2007 | Blanchard ............... A01D 34/69 74/650 |
| 2012/0129637 A1* | 5/2012 | Blanchard ............... A01D 34/69 474/116 |
| 2013/0220073 A1 | 8/2013 | Suto et al. |
| 2015/0245559 A1 | 9/2015 | Yang |
| 2016/0084361 A1 | 3/2016 | Barendrecht |
| 2018/0119754 A1 | 5/2018 | Teillet |
| 2018/0299005 A1 | 10/2018 | Barendrecht |
| 2018/0363756 A1 | 12/2018 | Teillet |

FOREIGN PATENT DOCUMENTS

| | | |
|---|---|---|
| DE | 4021669 | 2/1992 |
| DE | 102006036522 | 1/2008 |
| FR | 2940773 | 7/2010 |
| FR | 2995647 | 3/2014 |
| FR | 3004771 | 10/2014 |
| WO | 2013104191 | 7/2013 |

OTHER PUBLICATIONS

International Search Report dated Apr. 6, 2016.
EU Office Action dated Aug. 20, 2019.
U.S. Appl. No. 15/575,673 Office Action dated Jan. 22, 2020.
Search Report dated Mar. 3, 2016.

* cited by examiner

TRANSMISSION, AND RUNNING VEHICLE EQUIPPED WITH SUCH A TRANSMISSION

RELATED APPLICATION

This application is a National Phase of PCT/FR2016/051154, filed on May 17, 2016 which in turn claims the benefit of priority from French Patent Application Nos. 15 54463, filed on May 19, 2015; 15 54467, filed on May 19, 2015; 15 54465, filed on May 19, 2015; 15 54470 filed on May 19, 2015; and 15 54471, filed on May 19, 2015; the entirety of which are incorporated by reference.

BACKGROUND

Field of the Invention

The invention relates to a transmission, and to a wheeled vehicle fitted with such a transmission.

More particularly, the invention relates to a transmission comprising a shaft made as a single piece or as at least two shaft sections on a common axis, a wheel referred to as a "drive toothed" wheel mounted to rotate freely on said shaft, and a clutch mechanism arranged between the drive toothed wheel and the shaft for each of the shaft sections, the or each clutch mechanism being activated by driving the drive toothed wheel in rotation in a first rotary drive direction referred to as the "forward" direction, and being deactivatable by driving the shaft or the shaft section with which it co-operates in rotation in the forward direction when the speed of rotation of the shaft or of said shaft section is greater than the speed of rotation of the drive toothed wheel, the shaft or each shaft section in the deactivated state of the corresponding clutch mechanism being free to rotate in either direction of rotation, the or each clutch mechanism comprising: a clutch plate mounted to rotate freely on the associated shaft or shaft section and to which the rotary motion of the drive toothed wheel is suitable for being transmitted; a part carried by and constrained to rotate with the associated shaft or shaft section; and a brake for braking said clutch plate and acting continuously on the angular speed of said plate.

DESCRIPTION OF RELATED ART

Such a transmission incorporates a clutch that is said to be "automatic" that, in order to be operated, does not require a dedicated control member such as a fork, as is necessary for conventional clutches.

In such a transmission, when the toothed wheel is driven to rotate in a direction referred to as the "forward" direction, the clutch mechanism is deactivated so long as the speed of rotation of the shaft, which is generally the wheel drive shaft of the vehicle, is greater than the speed of rotation of the drive wheel. Because of the inertia of the vehicle, this characteristic generally makes it possible to deactivate the clutch mechanism(s) automatically when the vehicle stops. Specifically, when the vehicle is stopped, the drive toothed wheel stops rotating and the vehicle wheel drive shaft or shaft sections as entrained by the inertia of the vehicle serve to deactivate the clutch mechanism, thereby enabling the vehicle to be moved easily on the ground forwards or backwards.

For proper operation of an automatic clutch, it is necessary for the clutch plate to be braked permanently. Unfortunately, until now, the brake has been of complex design and difficult to install.

OBJECTS AND SUMMARY

An object of the invention is to propose a transmission in which the design of the clutch plate brake is simplified and installation of said brake is facilitated.

To this end, the invention provides a transmission comprising a shaft made as a single piece or as at least two shaft sections on a common axis, a wheel referred to as a "drive toothed" wheel mounted to rotate freely on said shaft, and either a clutch mechanism arranged between the shaft and the drive toothed wheel when the shaft is made as a single piece, or else two clutch mechanisms arranged one between one section of the shaft and the drive toothed wheel, and the other between the other section of the shaft and the drive toothed wheel, the or each clutch mechanism being activated by driving the drive toothed wheel in rotation in a first rotary drive direction referred to as the "forward" direction, and being deactivatable by driving the shaft or the shaft section with which it co-operates in rotation in the forward direction when the speed of rotation of the shaft or of said shaft section is greater than the speed of rotation of the drive wheel, the shaft or each shaft section in the deactivated state of the corresponding clutch mechanism being free to rotate in either direction of rotation, the or each clutch mechanism comprising: a clutch plate mounted to rotate freely on the associated shaft or shaft section and to which the rotary motion of the drive toothed wheel is suitable for being transmitted; a part carried by and constrained to rotate with the associated shaft or shaft section; and a brake of said clutch plate acting continuously on the angular speed of said plate, the transmission being characterized in that the brake of the, or of at least one of the, clutch plates is threaded on the shaft or on the shaft section carrying said plate.

Because it is possible to thread the brake on the shaft, it can be mounted like the clutch mechanism(s), such that the additional time needed by an operator for mounting the brake is no more than the time needed by the operator to thread an additional part onto the shaft.

Preferably, the brake of the, or of at least one of the, clutch plates is a friction brake member that is active by continuous bearing contact against the outer peripheral edge face of said clutch plate.

Preferably, the brake of the, or of at least one of the, clutch plates is constrained to rotate with the shaft or shaft section associated with said clutch plate.

Preferably, the brake of the, or of at least one of the, clutch plates is generally U-shaped.

Preferably, the brake of the, or of at least one of the, clutch plates comprises two spring blades extending along the shaft or the shaft section carrying said clutch plate, and a connection zone for connecting said spring blades together, said connection zone arranged at or in the vicinity of one of the ends of the spring blades, being provided with a through orifice to enable said brake to be threaded on the shaft or the shaft section carrying said clutch plate.

Preferably, said spring blades of the brake of the clutch plate are mounted so as to be constrained not to rotate about the shaft or the shaft section carrying said clutch plate, and preferably in diametrically opposite manner relative to the shaft or the shaft section carrying said clutch plate.

Preferably, the shaft or the shaft sections, the drive toothed wheel, and each clutch mechanism are housed at least in part inside a housing, and the spring blades, in order to be mounted so as not to rotate, are bent back at their free ends so as to form tongues suitable for sliding in respective axial grooves of the housing.

Preferably, the brake of the, or of at least one of the, clutch plates is formed by a folded and cut sheet.

Preferably, said clutch plate, arranged between the drive toothed wheel and the part is mounted to be axially movable towards and away from the drive toothed wheel and is arranged: in the activated state of the clutch mechanism, to engage with the part that is carried by, and constrained to rotate with, the shaft or the shaft sections; and in the deactivated state, to be decoupled from the part that is carried by, and constrained to rotate with, the shaft or the shaft section.

Preferably, the clutch plate and the part of the, or of at least one of the, clutch mechanisms and the drive toothed wheel are each provided with ramps, on at least one of their faces, the ramps of one face of the plate co-operating, during the activation stage, with the ramps of one plate of the drive toothed wheel to move the clutch plate axially in a first direction away from the drive wheel and to secure the clutch plate with the part that is carried by, and constrained to rotate with, the shaft or the shaft section, the ramps of the other face of the plate co-operating, during the deactivation state, with ramps of one face of the part that is carried by, and constrained to rotate with, the shaft or the shaft sections to cause the shaft or the shaft sections to freewheel by axially moving said clutch plate in the opposite direction.

Preferably, at least some of the ramps of the drive wheel and of the clutch plate are formed by one of the flanks of fluting or teeth projecting from said faces.

Preferably, the transmission has motor drive means for driving the drive toothed wheel, said motor drive means comprising a motor having a drive shaft, said drive shaft extending parallel to the longitudinal axis of the shaft or of each of the shaft sections.

Preferably, the motor drive means further comprise a gear mechanism arranged between the drive shaft and the drive toothed wheel, the gear mechanism, with which the drive toothed wheel is permanently engaged by meshing, comprising a plurality of gears, each mounted to rotate about an axis extending parallel to the drive shaft and to the shaft or each of the shaft sections.

Preferably, the shaft, the drive toothed wheel, and each clutch mechanism are housed at least in part inside a housing, the transmission being characterized in that the motor drive means for driving the toothed wheel in rotation comprise an epicyclic gear train arranged between the gear mechanism and the drive shaft, the epicyclic gear train comprising a planet carrier to which the rotary motion of the drive shaft is suitable for being transmitted, the planet carrier of the epicyclic gear train being constrained to rotate with a gear of the gear mechanism, this gear and the planet carrier forming a rotary assembly that is carried and guided in rotation inside the housing by a mechanical bearing, the bearing comprising an inner ring inside which said assembly is housed at least in part, and an outer ring surrounding the inner ring, said inner and outer rings being coaxial and mounted free to rotate relative to each other, the outer ring being mounted stationary inside the housing.

Preferably, the housing presents at least two housing elements that can be assembled together via a junction plane, and the wheel drive shaft or each of the wheel drive shaft sections extends transversely, preferably orthogonally, relative to said junction plane when the housing elements are in the assembled state.

Preferably, said housing, which presents at least two housing elements that can be assembled together via a junction plane and that, in the assembled state, define a cavity, includes both sealing means for sealing said cavity, which sealing means extend in the junction plane surrounding said cavity, and also holder means for holding the housing elements pressed one against the other by snap-fastening.

The invention also provides a self-propelled wheeled vehicle, such as a lawn mower, that requires a preferably-walking driver, the vehicle being characterized in that it is equipped with a transmission of the above type and in that the transmission shaft is a shaft for driving the wheels of said vehicle.

BRIEF DESCRIPTION OF THE DRAWINGS

The invention can be better understood on reading the following description of embodiments given with reference to the accompanying drawings, in which.

DETAILED DESCRIPTION

As mentioned above, the invention provides a transmission that is more particularly intended for application to a wheeled vehicle 1, in particular a vehicle requiring a walking driver.

Figure 1:
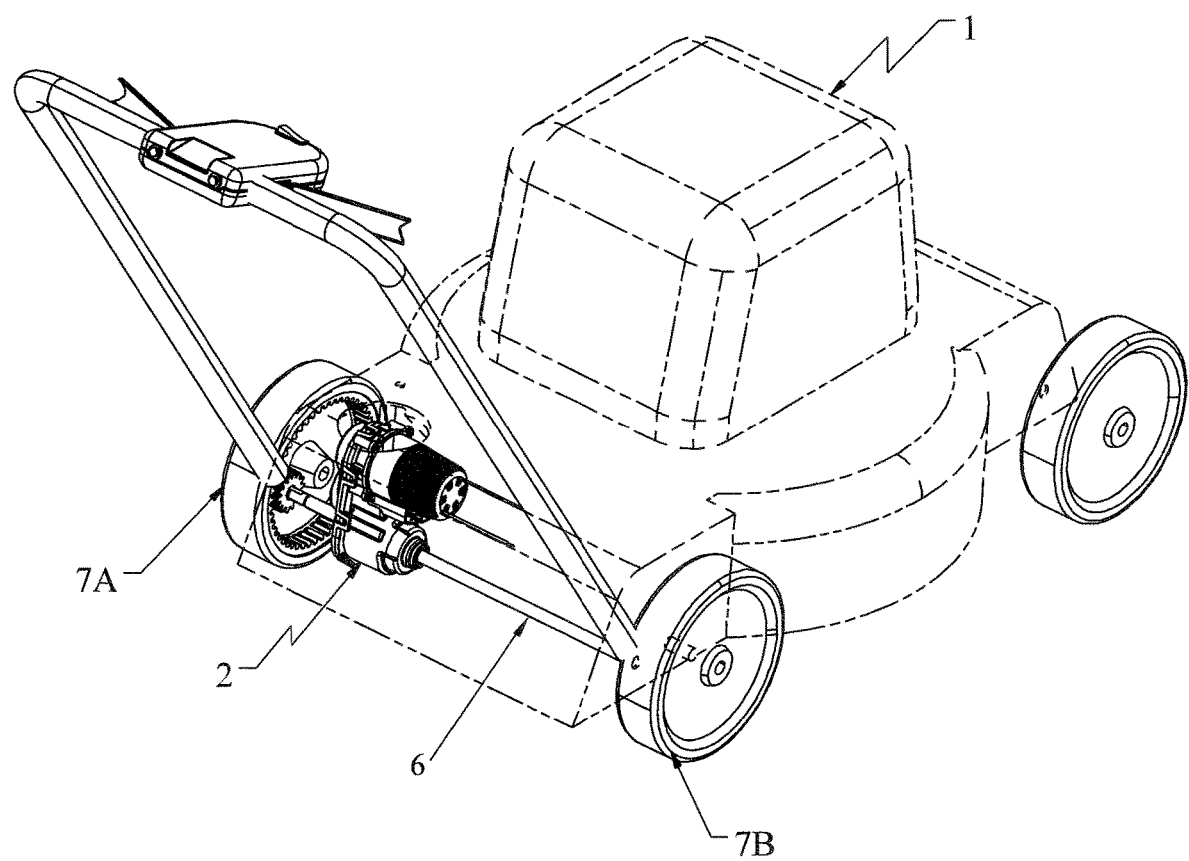
FIG. 1 is an overall view of a wheeled vehicle equipped with a transmission in accordance with the invention.
Figure 2:
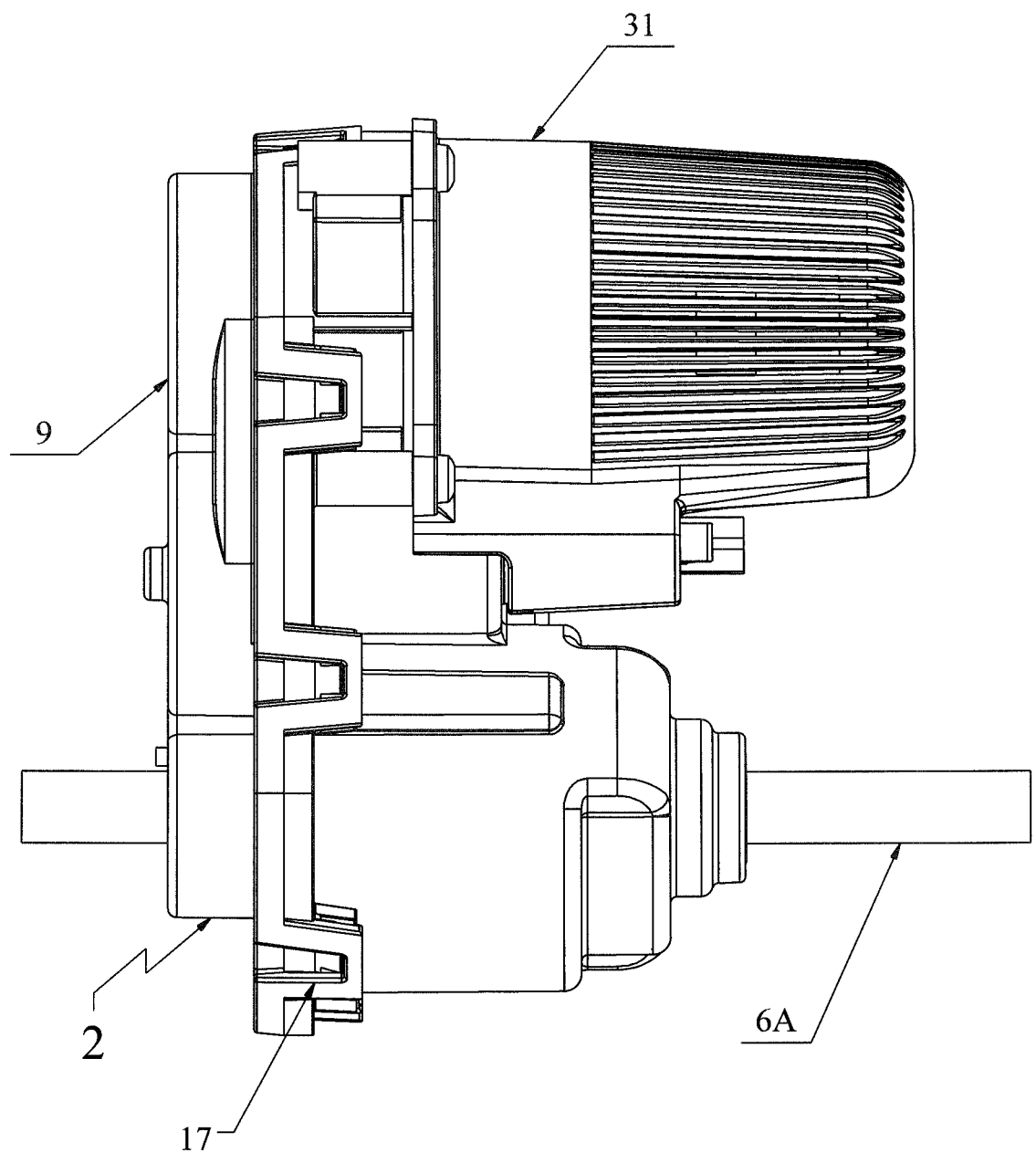
FIG. 2 is a perspective view of a housing for a transmission in accordance with the invention.

FIG. 1 shows the application of such a transmission to a lawn mover. The lawn mower comprises a wheeled chassis, the rear wheels of the chassis being referenced 7A and 7B in the figures.

The purpose of the transmission in this example is to transmit rotary motion to the rear wheels of said vehicle. The transmission thus comprises a shaft 6 made as a single piece, or as at least two shaft sections 6A and 6B on a common axis, and, in this example, forming the drive shaft for wheels 7A and 7B in a single pair of wheels of the vehicle.

A drive toothed wheel 5 is mounted to rotate freely on the shaft 6. A clutch mechanism 8 is arranged between the drive wheel 5 and the shaft 6, or each of its shaft sections 6A, 6B.

Figure 4:
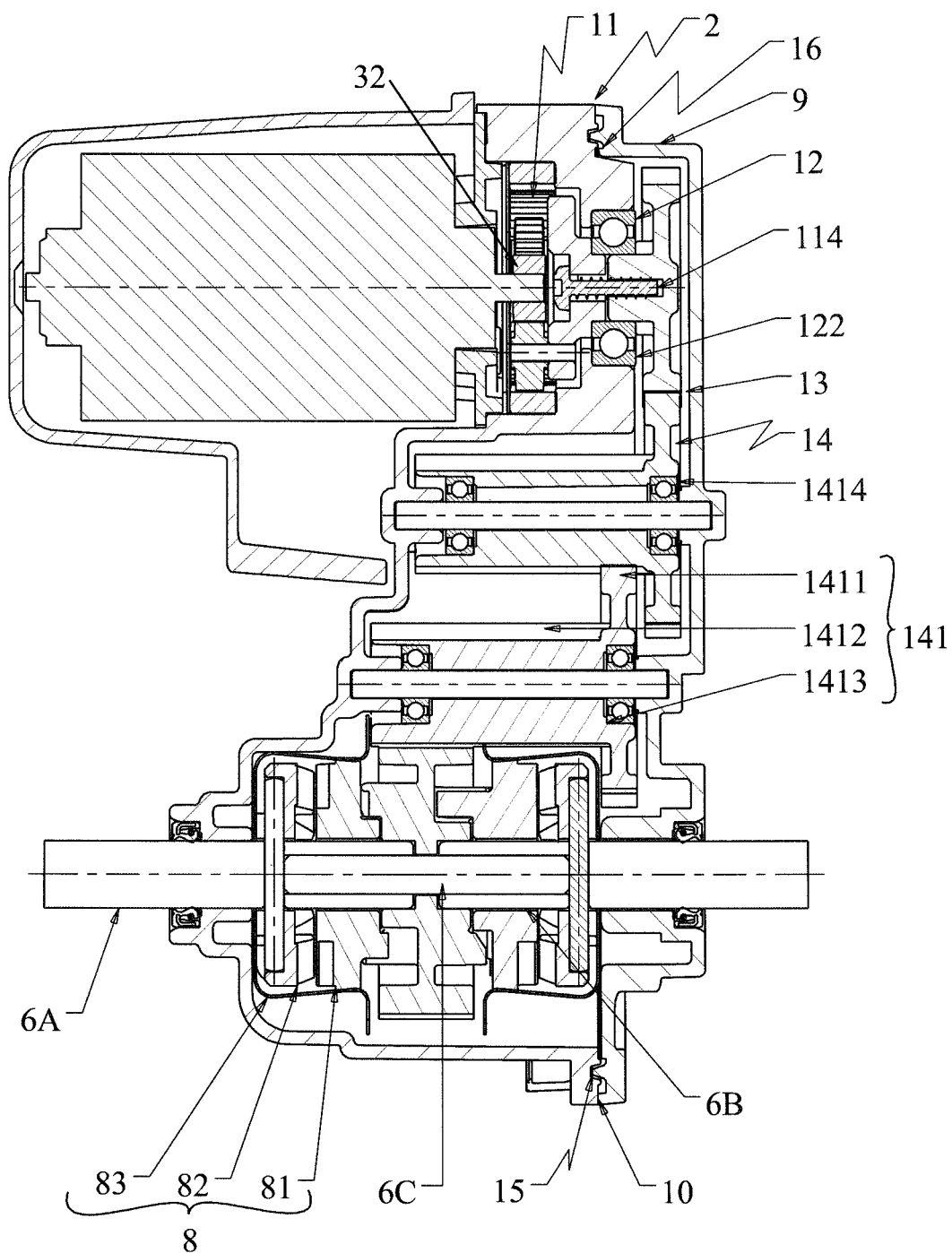
FIG. 4 is a section view of a transmission in accordance with the invention, with the shaft being made up of two shaft sections.

In the example of FIG. 4, the shaft 6 is made up of two shaft sections 6A, 6B on a common axis that are connected together by a connection element 6C to which said shaft sections are mounted free to rotate so that when in the aligned state they can perform relative movement in rotation. Under such circumstances, the transmission has two clutch mechanisms 8, each arranged between the drive toothed wheel 5 and one of the sections 6A, 6B of the wheel drive shaft. One of these clutch mechanisms 8 is suitable for transmitting the motion of the drive wheel 5 to the wheel drive shaft section 6A and the other clutch mechanism is suitable for transmitting the motion of the drive wheel 5 to the wheel drive shaft section 6B. Thus, the drive wheel 5 arranged coaxially about the wheel drive shaft sections is arranged between two clutch mechanisms, each clutch mechanism 8 being carried at least in part by a wheel shaft section for a single pair of wheels of the vehicle.

Figure 5:
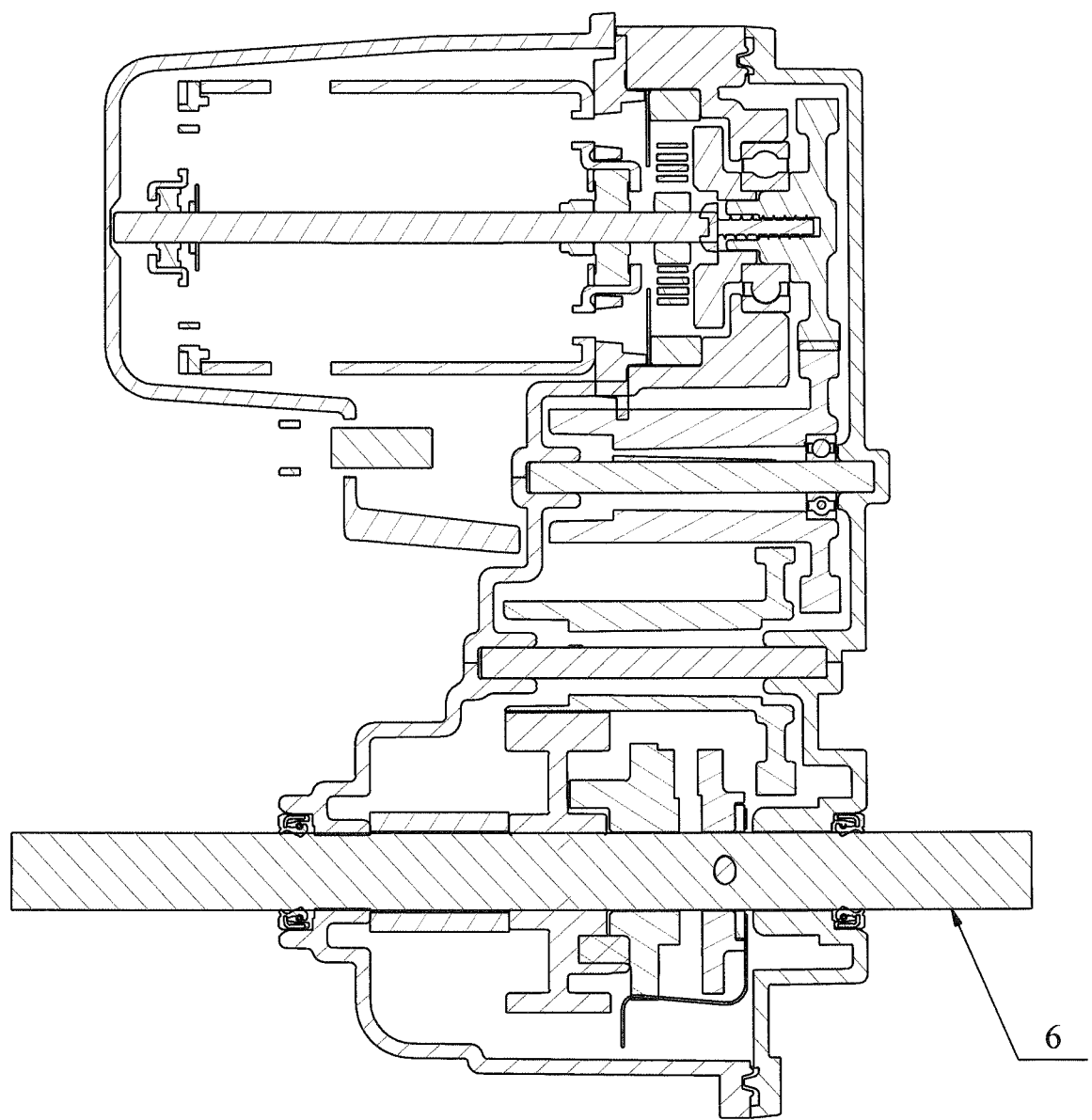
FIG. 5 is a section view of a transmission in accordance with the invention, with the shaft made as a single piece.

In the example shown in FIG. 5, the shaft 6 is made as a single piece and has only one clutch mechanism 8. The design and the operation of the clutch mechanisms 8 are identical for FIGS. 4 and 5.

Each clutch mechanism 8 comprises: a clutch plate 81 mounted to rotate freely on the associated shaft 6 or section 6A, 6B; a part 82 carried by and constrained to rotate with the associated shaft 6 or shaft section 6A, 6B; and a brake 83 of said clutch plate 81 that acts continuously on its angular velocity.

The term "clutch plate" is used to mean a plate that participates directly or indirectly in clutching.

Figure 3A:
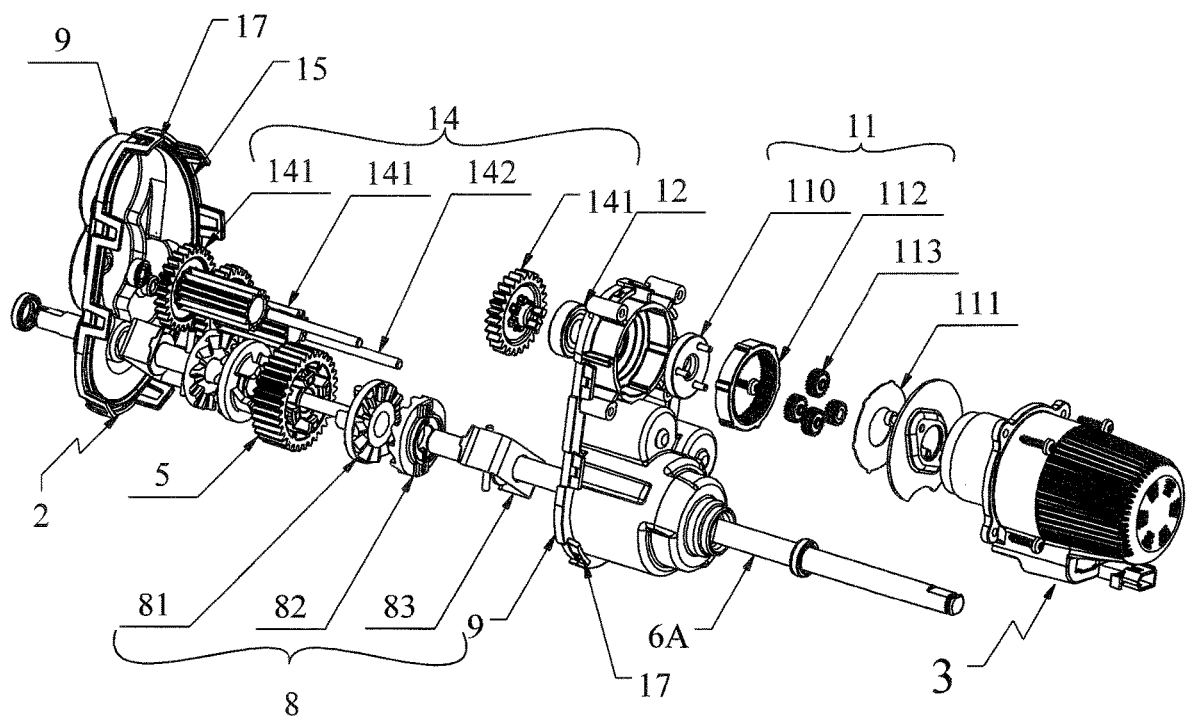
FIG. 3A shows elements constituting a transmission in accordance with the invention in an exploded position.
Figure 3B:
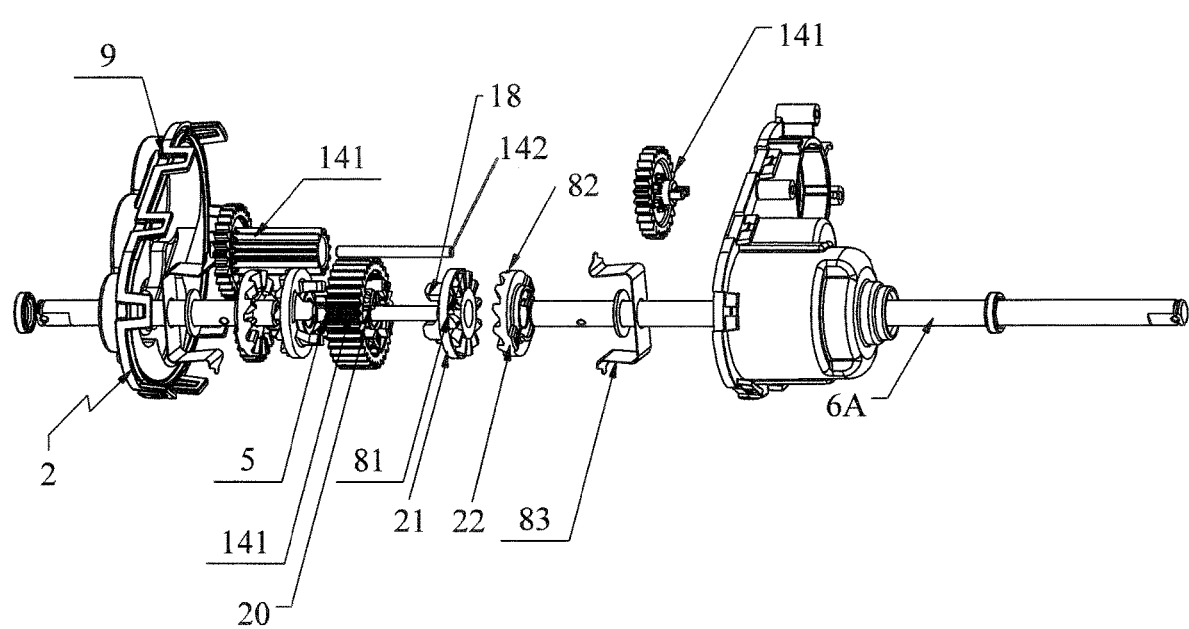
FIG. 3B is a fragmentary view in an exploded position showing elements carried by the drive shaft of the wheels of the vehicle.

In the example shown in FIGS. 3A and 3B, said clutch plate 81, arranged between the drive wheel 5 and the part 82 and to which the rotary motion of the drive wheel 5 can be transmitted, is mounted to move axially towards or away from the drive wheel 5 and is placed, in the activated state of the clutch mechanism 8, spaced apart from the drive toothed wheel 5 and engaging the part 82 carried by and constrained to rotate with the shaft 6 or the shaft section 6A, 6B, and in the deactivated state, close to the drive wheel 5 and decoupled from the part 82 carried by and constrained to rotate with the shaft 6 or the shaft section 6A, 6B.

In order to enable the clutch plate 81 to move axially in this way along the shaft or the shaft section that carries it, the clutch plate 81 and the part 82 of each clutch mechanism and the drive wheel 5 are provided with ramps on at least one of their faces.

During the activation stage, which is obtained by the drive toothed wheel 5 being driven in rotation in a first direction of rotation referred to as the "forward" direction, the ramps 18 of one of the faces of the plate 81 co-operate with ramps 20 of one of the faces of the drive wheel 5 in order to move the clutch plate 81 axially in a first direction away from the drive toothed wheel 5 so as to secure the clutch plate 81 with the part 82 that is carried by and constrained to rotate with the shaft 6 or the shaft section 6A, 6B.

During the deactivation stage, which is obtained by the shaft or the shaft section with which the clutch mechanism co-operates being driven in rotation at a speed that is greater than the speed of rotation of the drive toothed wheel 5, the ramps 21 of the other face of the plate 81 co-operate with the ramps 22 of one of the faces of the part 82 that is carried by and constrained to rotate with the shaft or the shaft section 6A, 6B so as to cause the shaft 6 or the shaft section 6A, 6B, to be allowed to freewheel by moving said clutch plate 81 axially in the opposite direction.

In the activated state, the clutch plate is thus arranged away from the drive toothed wheel 5, i.e. spaced apart from the drive wheel 5 by a distance that is greater than the distance between it and the drive wheel 5 in the deactivated state.

The ramps of the toothed wheel 5 and of the clutch plate 81 in this example are formed by one of the flanks of fluting or teeth projecting from said faces.

In the example shown in FIG. 3B, the toothed wheel constituting the driven member 5 presents on each of its faces a ring of teeth in which each tooth has two flanks parallel to the axis of rotation of the wheel drive shaft, each flank being connected to the tip of the tooth by a cut-off corner.

On its face facing towards the driven member 5, the clutch plate 81 has a ring of teeth with each tooth having a flank parallel to the axis of rotation of the wheel drive shaft sections and a sloping flank forming an angle with said axis of rotation. The sloping flank is formed by the ramp given reference 18 in the figures.

This flank is the flank that is stressed during forward drive of the drive toothed wheel 5 by coming into bearing contact with a tooth of the drive toothed wheel 5 in order to cause the clutch plate to move axially away from the toothed wheel 5.

The other face of the plate, i.e. its face that faces towards the part 82 that is constrained to rotate with the wheel drive shaft section, constituted in this example by a ramped wheel, comprises in the same manner a ring of teeth having flanks, one straight and the other sloping.

The part 82, which is in the form of a wheel that is constrained to rotate with the wheel drive shaft section also includes a ring of teeth, in which each tooth presents one flank that slopes and the other flank that is straight.

During forward drive of the drive wheel 5 with the clutch plate 81 being in its state spaced apart from the drive wheel 5, for each tooth of the plate 81 and of the part 82, a straight flank of a tooth of the plate co-operates with a straight flank of a tooth of the part 82 that is constrained to rotate with the wheel drive shaft section.

This co-operation by bearing contact continues so long as the rotary drive speed of the wheel drive shaft section is slower than the speed of the drive wheel 5.

When the wheel rotary drive speed becomes greater than the speed of rotation of the drive wheel 5, e.g. during a turn for the wheel of the shaft forming the outer wheel in said turn, the drive shaft section and its part 82 become driving, such that each tooth of the part 82 co-operates via its ramp-forming sloping flank by bearing contact against the ramp-forming sloping flanks of the teeth of the clutch plate, so as to cause the clutch plate to move axially towards the toothed wheel 5 as far as a position in which said ramps are decoupled, corresponding to the deactivated state of the clutch mechanism.

Figure 18:
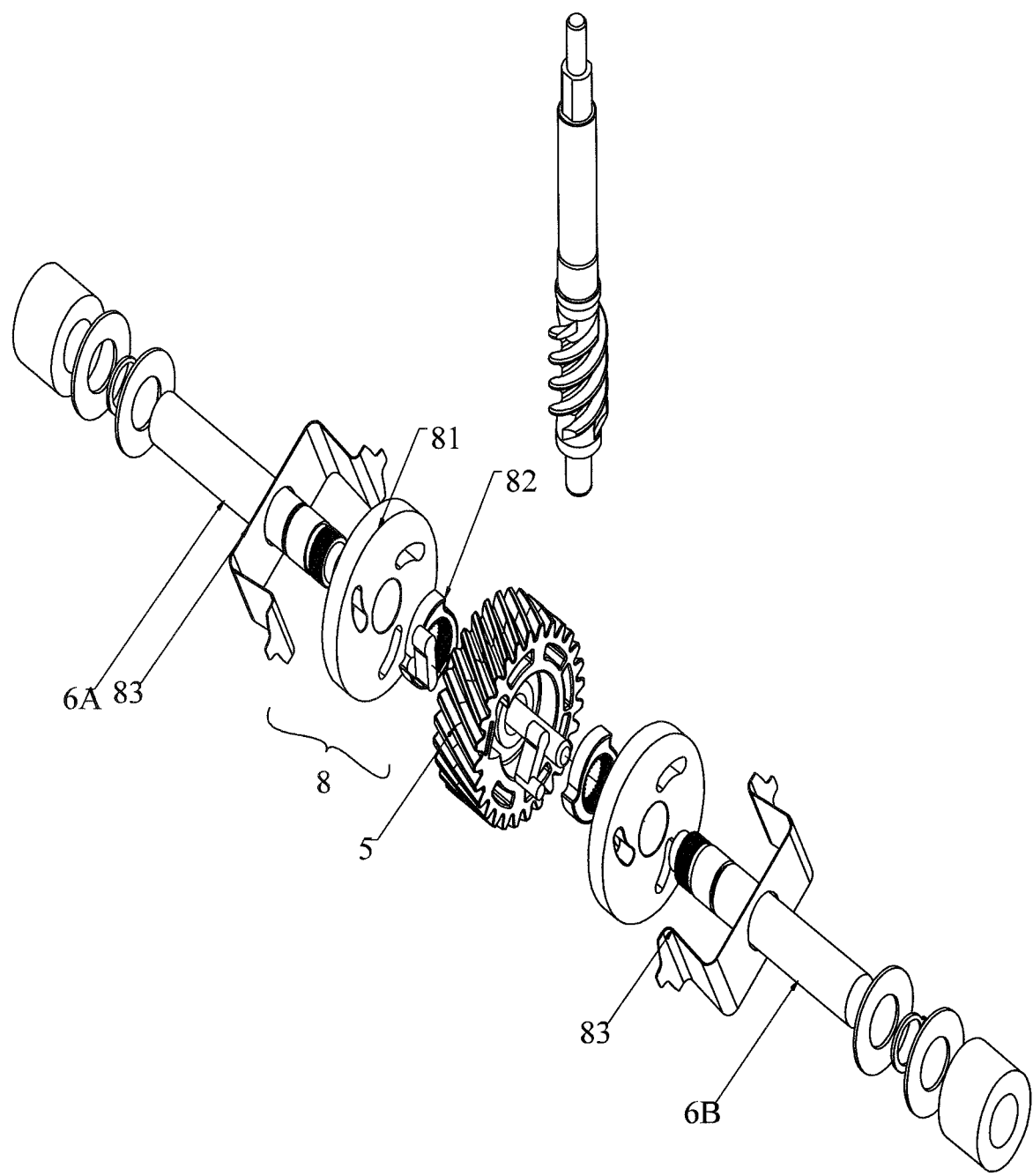
FIG. 18 is a view in the exploded position of elements of another embodiment of a clutch mechanism.
Figure 19:
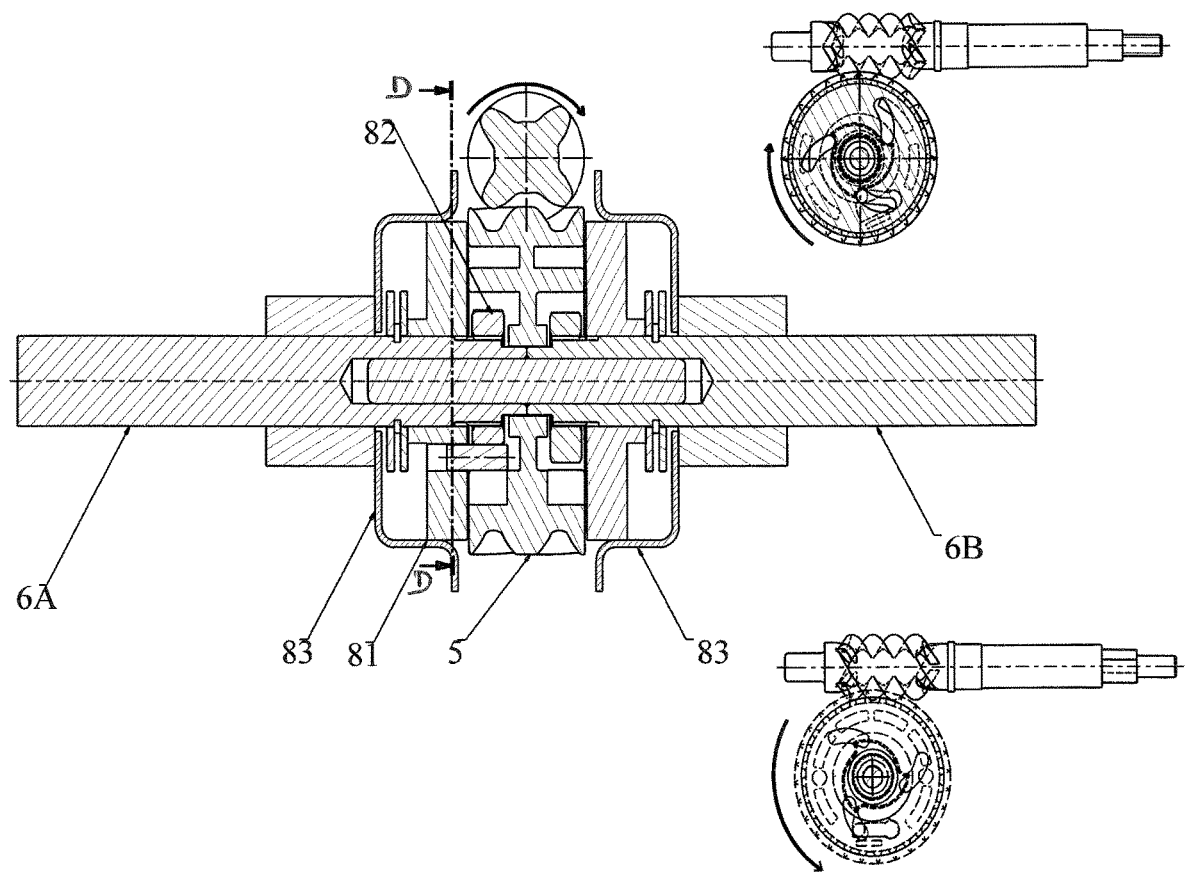
FIG. 19 is a section view of the clutch mechanism of FIG. 18 with detail views on DD both in the clutched position and in the unclutched position of the mechanism.

FIGS. 18 and 19 show a variant of the clutch mechanism. In such a clutch mechanism, the drive wheel 5 carries a key having a pin that is mounted to slide in a kidney-bean-shaped slot in the clutch plate 81 so as to allow the key to move from a declutched position to a clutched position engaged with a part 82 that, in this example, is in the form of a hub constrained to rotate with the associated shaft or shaft section. Once more, the hub has a ramp that co-operates with the key to pass the key from a position engaged with the hub and corresponding to the activated state of the clutch mechanism to a position spaced apart from the hub and corresponding to the deactivated state of the clutch mechanism, when the rotary drive speed of the vehicle wheel becomes greater than the rotary speed of the drive wheel 5.

As mentioned above, each clutch plate 81 is braked continuously, using a brake 83 that is threaded on the shaft or shaft section 6A, 6B carrying said plate 81. Thus, for a shaft 6 made as a single piece, the transmission has only one brake, whereas when the shaft 6 is made of two shaft sections 6A and 6B on a common axis, it has two brakes, i.e. one brake per plate.

On each occasion, the brake 83 is a friction brake member that acts by continuous bearing contact against the outer peripheral edge face of said clutch plate 81. In this example, the brake 83 is generally U-shaped, and is mounted stationary in rotation about the shaft or the wheel drive shaft section that is associated with said clutch plate.

The brake 83 comprises two spring blades 831 extending along the shaft 6 or shaft section 6A, 6B carrying said clutch plate 81, and a zone 832 connecting said spring blades 831 together.

Said connection zone 832 arranged at or in the vicinity of one of the ends of the spring blades 831 is provided with a through orifice 833 so as to enable said brake 83 to be threaded onto the shaft 6 or the shaft section 6A, 6B carrying said clutch plate 81.

Said spring blades 831 of the brake 83 for the clutch plate 81 are mounted about the shaft 6 or the shaft section 6A, 6B carrying said clutch plate 8 so as to be stationary in rotation, and preferably so as to be diametrically opposite about the shaft 6 or the shaft section 6A, 6B carrying said clutch plate 81.

Like the shaft 6 or the shaft sections 6A, 6B, the drive wheel 5 and each clutch mechanism 8 are housed at least in part inside a housing, the spring blades 831 being bent back at their free ends so as to mount them stationary in rotation by forming respective tongues suitable for sliding in corresponding axial grooves 19 in the housing 2.

In the examples shown, the brake 83 is formed by a folded and cut metal sheet.

In order to enable the drive wheel 5 to be driven in rotation, the transmission has motor drive means 3 that may have a very wide variety of forms. Thus, these motor drive means 3 may be formed by a belt transmission between a drive shaft and a wormscrew engaged with the toothed wheel 5.

In the example shown, the motor drive means 3 comprise a motor 31 having a motor shaft 32, said motor shaft 32 extending parallel to the longitudinal axis of the shaft 6 or of each of the shaft sections 6A, 6B. These motor drive means 3 further comprise both a clutch mechanism 14 that is arranged between the drive shaft 32 and the toothed wheel 5 and that is permanently engaged with said toothed wheel 5, and also an epicyclic gear train between the drive wheel 32 and the clutch mechanism 14, these elements enabling the rotary motion of the drive shaft 3 to be transmitted to said toothed wheel 5.

It should be observed that the drive shaft 32 may be driven in rotation in one direction or else in two opposite directions.

The clutch mechanism 14 arranged between the drive shaft 32 and the toothed wheel 5 and with which the toothed wheel 5 is permanently engaged by meshing, comprises a plurality of gears 141, each mounted to rotate about an axis extending parallel to the drive shaft 32 and to the wheel drive shaft 6, or each of the wheel drive shaft sections 6A, 6B.

This plurality of gears 141 includes a gear 141 constrained to rotate with the planet carrier 110 of the epicyclic gear train as described below together with two double gears 141, each comprising two sets of teeth of different diameters. Said double gears 141 are identical from one gear to the other.

Each double gear 141 is carried by a support shaft 142 that extends between two housing elements. Said support shafts 142 are identical from one double gear 141 to another, for simplifying fabrication.

Each double gear 141 comprises a toothed wheel 1411 suitable for forming the first set of teeth of the gear 141 and a splined tube 1412 suitable for forming the second set of teeth of the gear, which wheel and tube are constrained to rotate together about a common axis, said double gears 141 being axially offset to allow said double gear 141, referred to as the "downstream" gear, in meshing engagement with the driven member 5 to engage via its toothed wheel 1411 with the splined tube 1412 of the double gear 141, referred to as the "upstream" gear, that, relative to the downstream gear, is positioned closer to the drive shaft 32.

Inside its toothed wheel 1411, each double gear 1411 has an annular housing 1413, and a bearing member 1414 is housed in the "upstream" double gear 141 that is positioned closer to the drive shaft 32.

The upstream double gear 141 engages the gear 141 that is constrained to rotate with the planet carrier 110 of the epicyclic gear train 11, as described below.

Each double gear 141 is provided internally with at least one longitudinal groove 1415, specifically five longitudinal grooves in this example. Each groove 1415 is suitable for forming a supply of lubricant. Each longitudinal groove presents a petal-shaped curved profile from one end of said groove.

The epicyclic gear train 11 arranged between the clutch mechanism 14 and the drive shaft 32 comprises: an inner sunwheel 111 constrained to rotate with the drive shaft 32; an outer ring 112 fastened to the housing 2; planets 113 engaged by meshing with the sunwheel and the ring; and a planet carrier 110 to which the rotary motion of the drive shaft 32 is transmitted via the epicyclic gear train 11.

The planet carrier 110 together with the gear 141 of the clutch mechanism forms a rotary assembly that is carried and guided in rotation inside the housing by a rolling bearing 12.

The bearing 12 comprises an inner ring 121 inside which said assembly is received at least in part, and an outer ring 122 surrounding the inner ring 121.

The inner and outer rings are coaxial rings that are mounted to be free to rotate relative to each other. The ring 122 is held stationary inside the housing 2.

Rolling members such as balls, needles, etc., are arranged between the inner and outer rings to allow the rings to rotate freely relative to each other. For mounting purposes, the inner ring of the bearing is constrained to rotate with the planet carrier 110 and the gear 141, sandwiched between the planet carrier 110 and the gear 141.

For this purpose, the planet carrier 110 and the gear 141 each present an inner portion inside the inner ring of the bearing, being inserted inside the ring, an outer portion outside the inner ring of the bearing, and a shoulder at the interface between the inner and outer portions.

The inner ring 121 of the bearing 12, which has an inner circumferential face, an outer circumferential face, and two side faces connecting the circumferential faces together, is sandwiched between the planet carrier 110 and the gear 141 via its side faces, which side faces are clamped between the shoulders of the planet carrier 110 and the gear 141.

In addition, in order to be constrained to rotate together, the planet carrier 110 and the gear 141 are connected together by a connection member, specifically a screw 114, and they present geometrical shapes that are complementary.

Driving the inner sunwheel in rotation drives rotation of the planets 113 engaged therewith by meshing with the inner circumferential teeth of the outer ring 112. Since this ring is a stationary ring secured to the housing, the planets 113, each of which is threaded on a respective planet carrier shaft, tend to drive rotation of the planet carrier 110, which itself drives rotation of the gear 141 to which it is secured.

This rotary motion is transmitted by the clutch mechanism 14 to the toothed wheel 5, which is mounted to rotate freely on the wheel drive shaft 6 of the vehicle. As mentioned above, the shaft 6, the drive toothed wheel 5, and each clutch mechanism 8 are housed at least in part inside a housing 2.

The housing 2 presents at least two housing elements 9 that can be assembled together via a junction plane 10, and the shaft 6 or each of the shaft sections 6A, 6B extend transversely, preferably orthogonally, relative to said junction plane 10 when the two housing elements 9 are assembled together.

Each shaft section thus passes through a housing element 9 via the end of a half-shell formed by said housing elements. The housing 2, which defines a cavity 13 when said elements 9 are in the assembled state, includes sealing means 15 for sealing said cavity 13, which means lie in the junction plane 10, surrounding said cavity 13, together with holder means 17 for holding the housing elements 9 pressed one against the other by snap-fastening.

Figure 9:
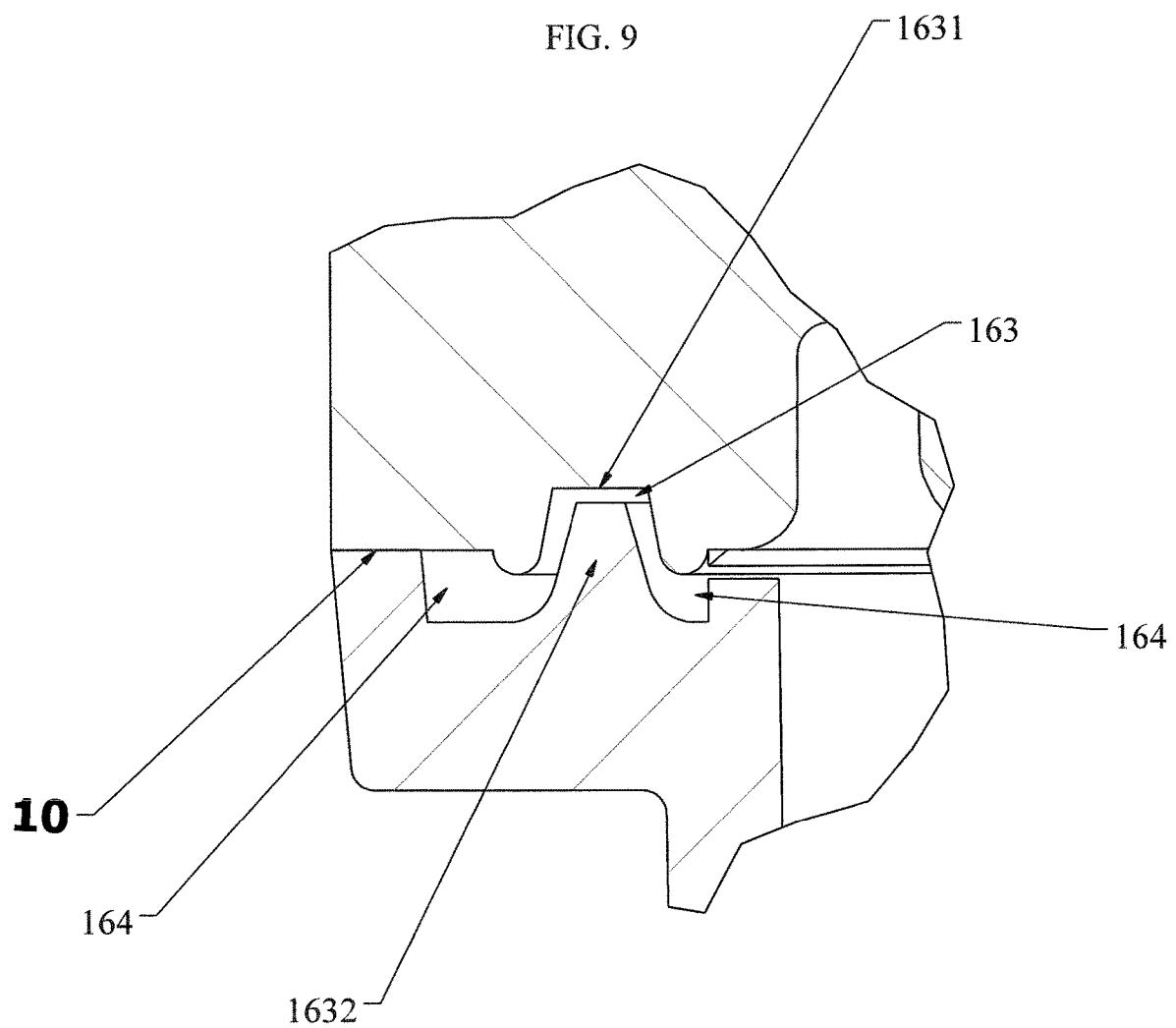
FIG. 9 is a detail view of an embodiment of adhesive connection means.
Figure 10:
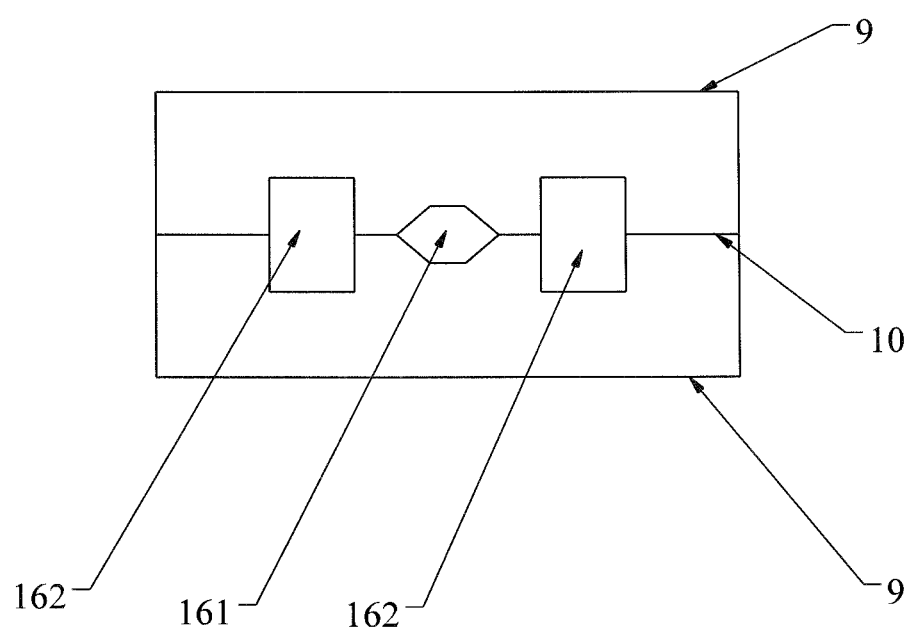
FIG. 10 is a detail view of another embodiment of the adhesive connection means.
Figure 11:
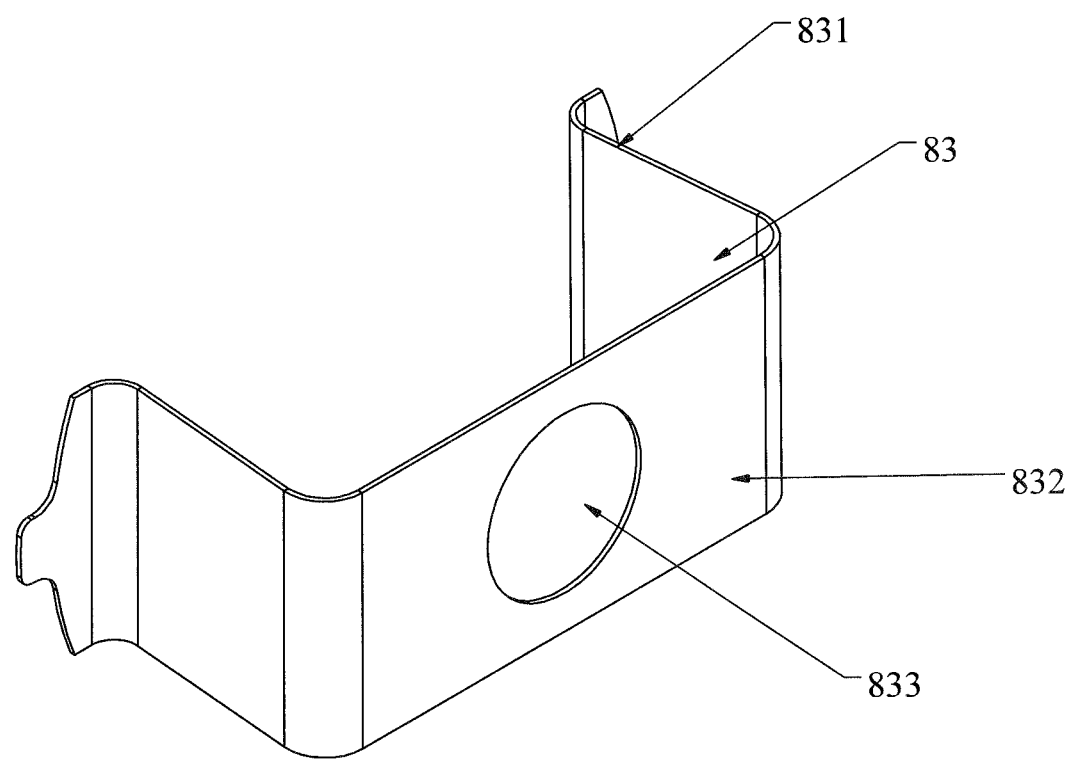
FIG. 11 is a perspective view of a brake.
Figure 12:
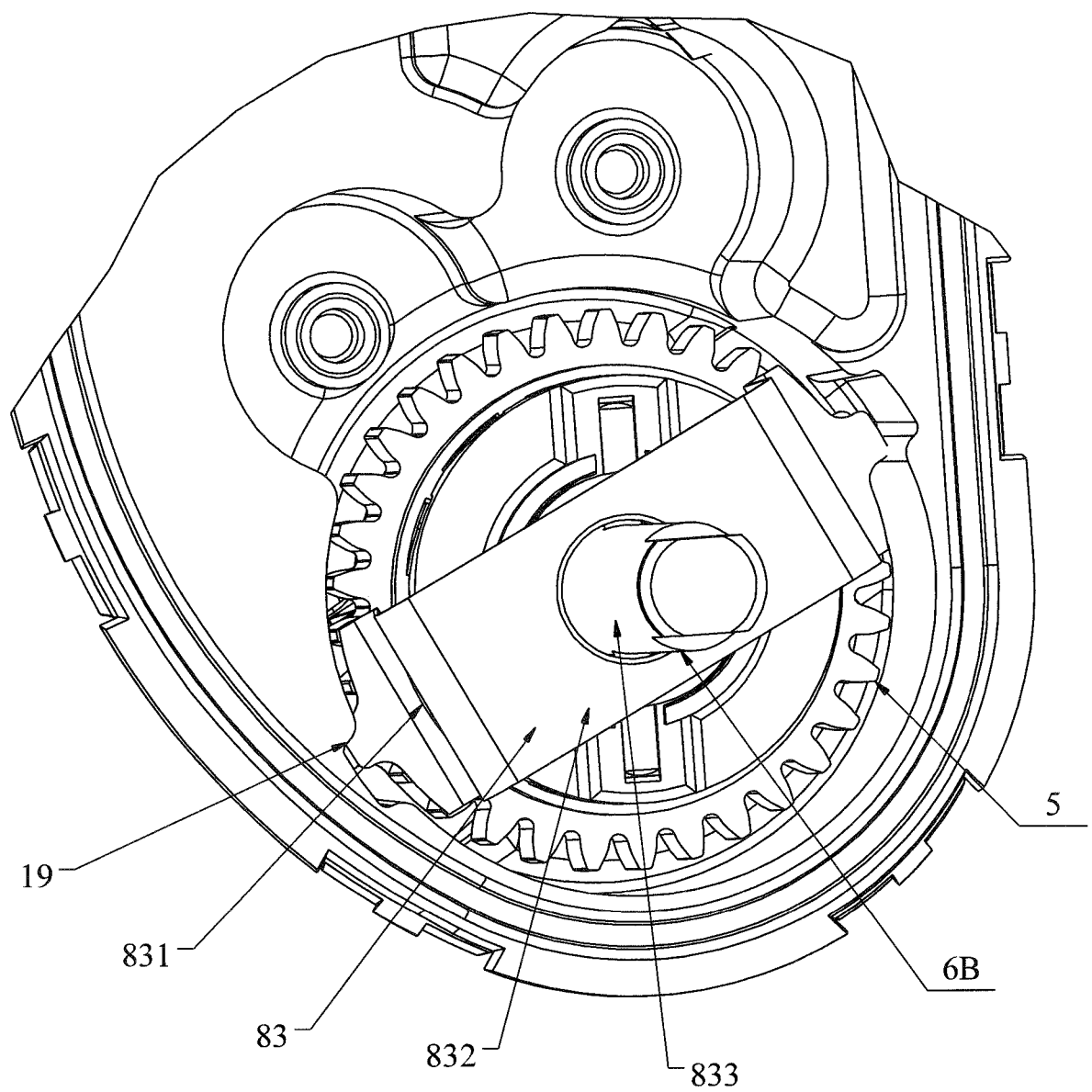
FIG. 12 is a detail view of a brake in position on the shaft.
Figure 13:
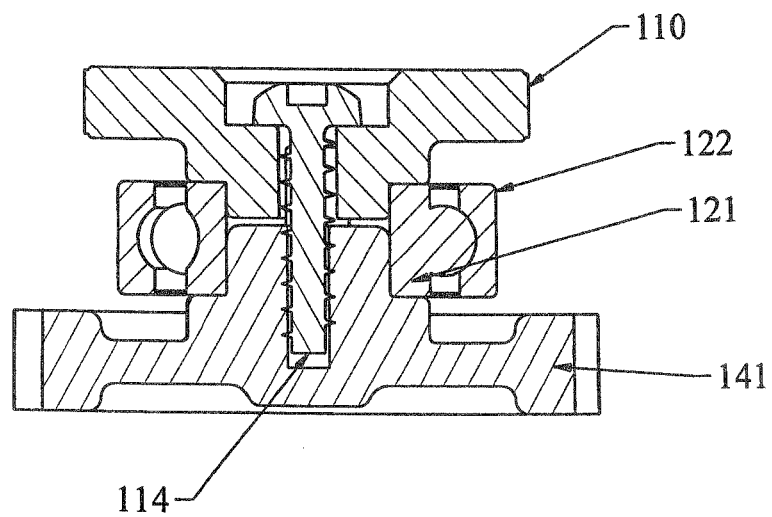
FIG. 13 is a section view of the connection between an epicyclic gear train and a clutch mechanism.
Figure 14:
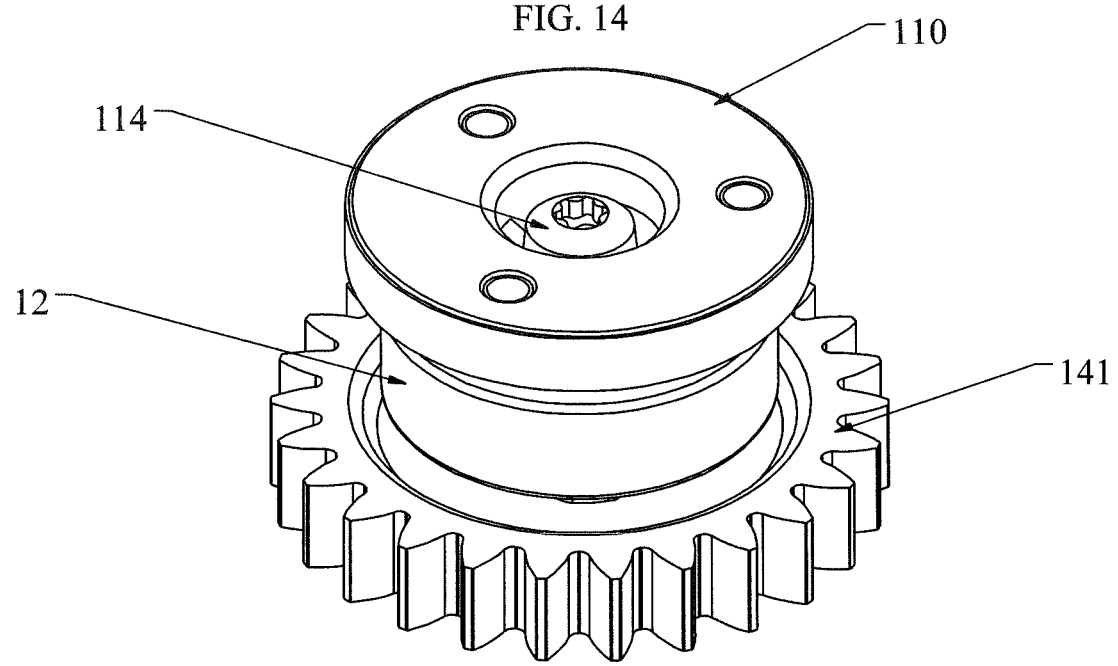
FIG. 14 is a perspective view of FIG. 13.
Figure 15:
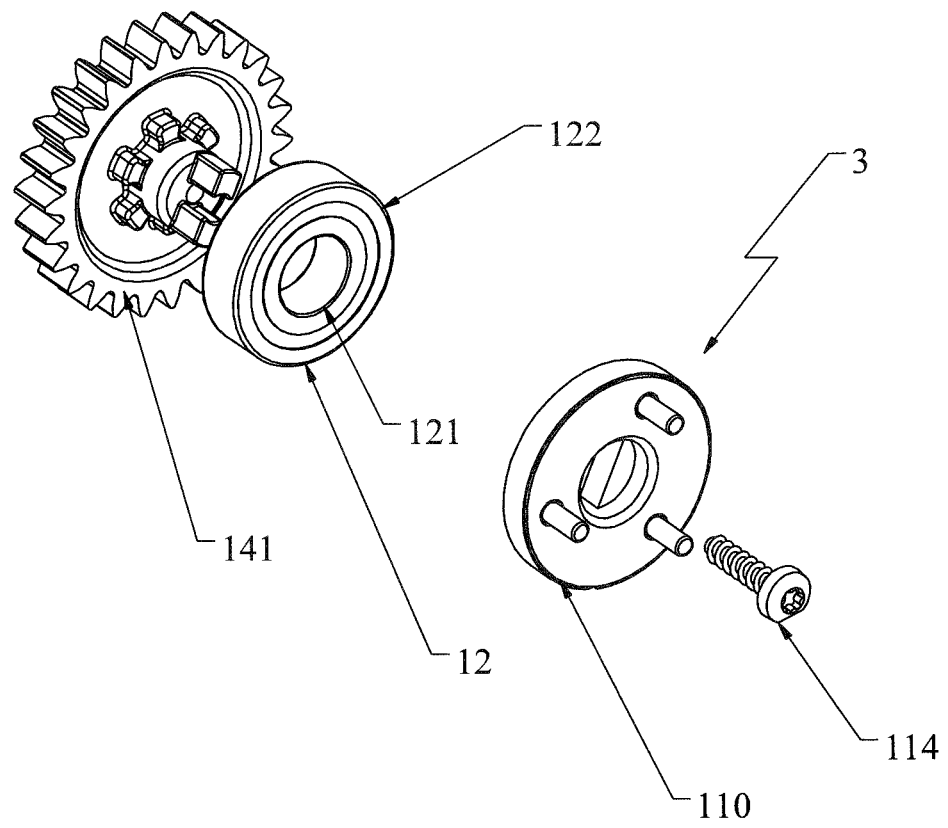
FIG. 15 is a view in the exploded position of elements making up the connection between an epicyclic gear train and a clutch mechanism.
Figure 16:
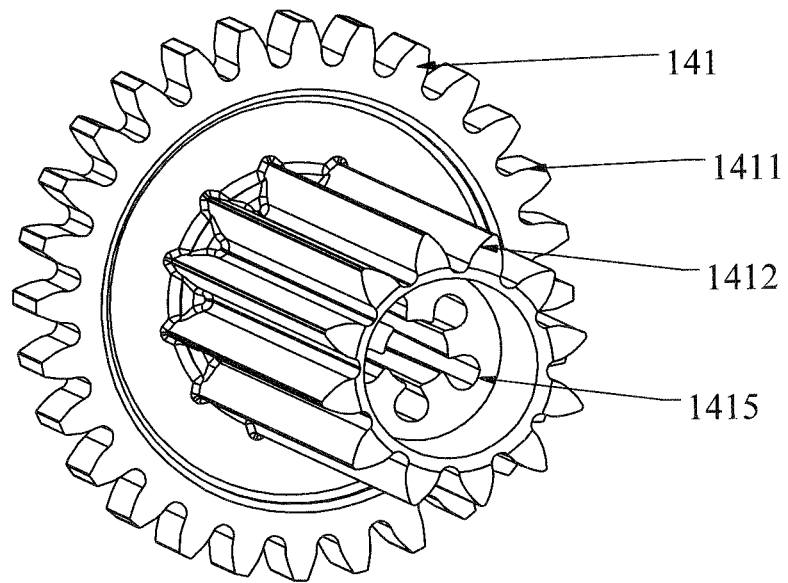
FIG. 16 is a perspective view of a double gear.
Figure 17:
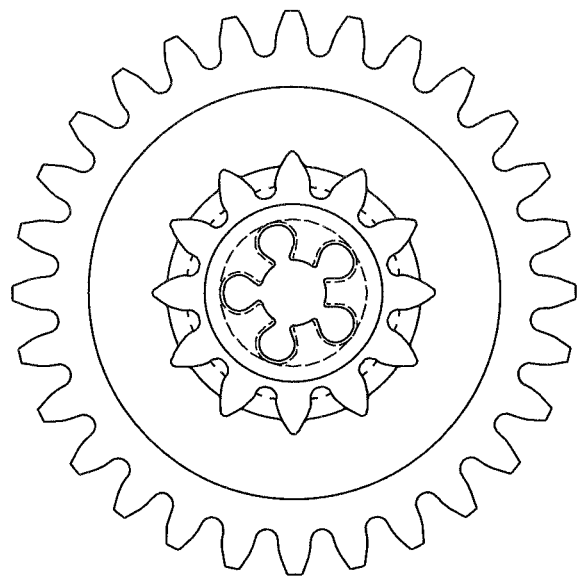
FIG. 17 is a view seen from one end of a double gear.

In the example shown by way of example in FIGS. 5, 9, and 10, the sealing means 15 of said cavity are adhesive connection means 16 for connecting said housing elements 9 together.

Figure 6:
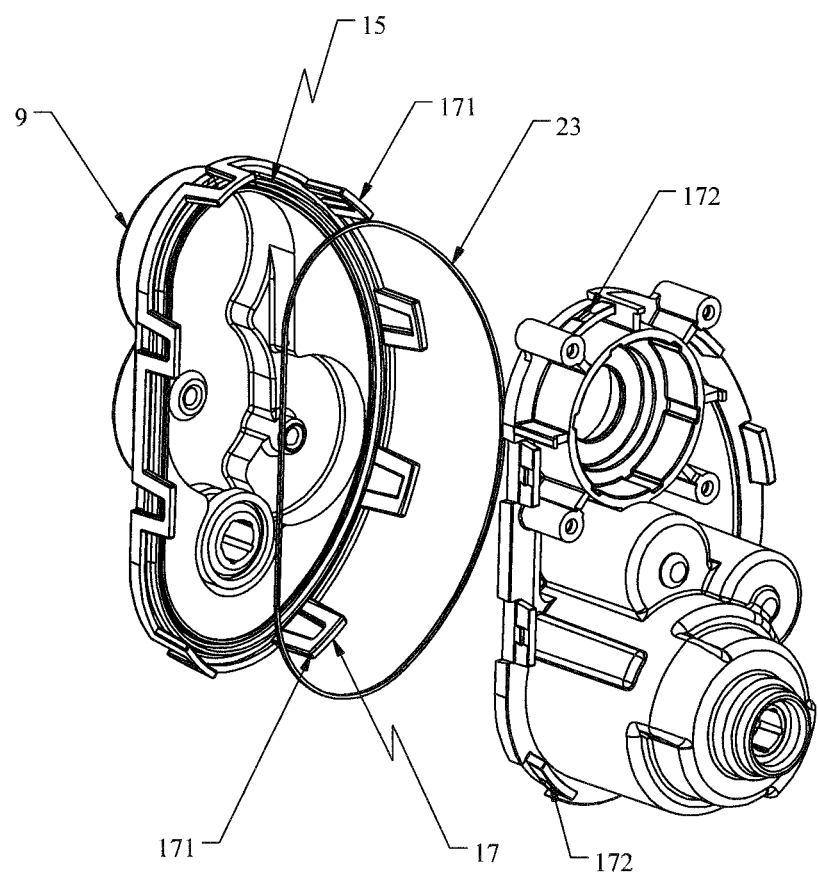
FIG. 6 is a perspective view of housing elements in the non-assembled state.

In a variant, or in addition, and in non-preferred manner, the sealing means 15 could alternatively be in the form of a gasket 23 that is inserted in a groove formed in the junction plane, the gasket surrounding said cavity 13, as shown in FIG. 6.

When the adhesive connection means 16 are connection means 16 as shown in FIG. 10, the adhesive connection means 16 comprise a "main" groove 161 for receiving adhesive. This peripheral main groove 161 surrounds said cavity 13 and is arranged between two "auxiliary" grooves 162, each running parallel to the main groove 161 in the assembled state of said housing elements 9.

The main groove is formed by two peripheral grooves, each arranged in one of the housing elements, and extending around the cavity, said grooves being positioned facing each other when the housing elements are in the assembled-together state. The same applies to the auxiliary grooves.

Thus, when assembling the housing elements together by adhesive, the adhesive is placed in one or both of the grooves making up the main groove and the housing elements are brought together. If excess adhesive is placed in the main groove, that excess creeps into the auxiliary grooves, one of which prevents the adhesive from penetrating into the inside of the housing, and the other of which prevents adhesive from seeping to the outside of the housing.

When the adhesive connection means 16 are connection means 16 as shown in FIG. 9, the adhesive connection means 16 comprise a "main" groove 163 for receiving adhesive and surrounding said cavity 13, together with at least one auxiliary groove 164 running parallel to the main groove 163 when said housing elements 9 are in the assembled-together state. Said peripheral main groove 163 comprises a female element 1631, such as a groove that is carried by one of the housing elements 9. The female element 1631 is arranged facing a male element 1632, such as a rib, that is carried by the other housing element 9 in the assembled state of said housing elements 9, with the male element 1632 being engaged at least in part in the female element 1631 in the assembled-together state of said housing elements 9.

By way of example, the auxiliary groove(s) may be formed by a simple groove surrounding the cavity and formed in at least one housing element.

Figure 7:
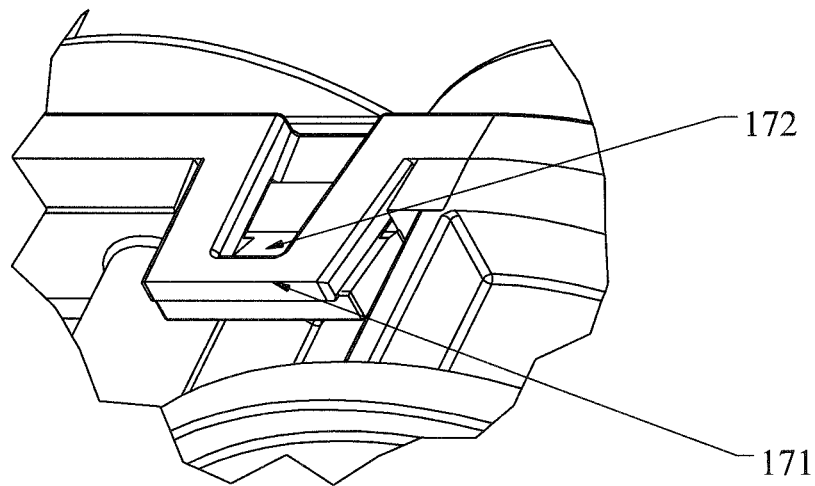
FIGS. 7 and 8 are detail views showing snap-fastener holder means.
Figure 8:
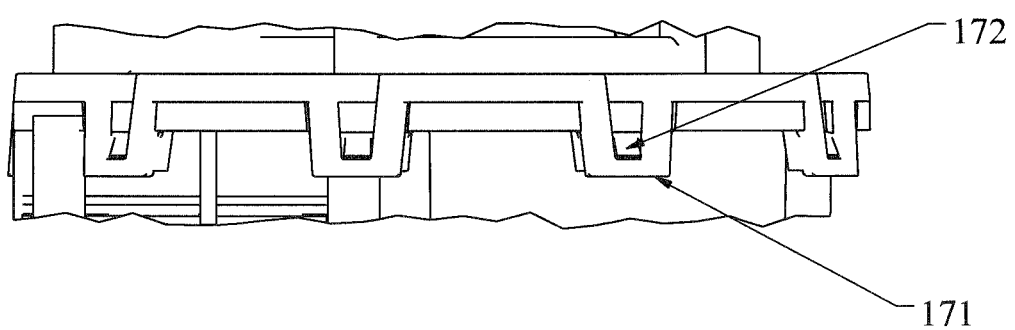

As mentioned above, the housing also includes means 17 for holding the housing elements pressed one against the other by snap-fastening. In the example shown in FIGS. 6 to 8, the means 17 for holding the housing elements 9 pressed one against the other by snap-fastening comprise a plurality of lugs 172 arranged around the periphery of one of the housing elements 9 and a plurality of recesses arranged around the periphery of the other housing element 9 to form a plurality of loops 171, each lug 172 being suitable for being inserted in a loop 171 when the housing elements 9 are pressed one against the other via their junction plane 10.

The loops 171 are elastically deformable and, when the housing elements are brought together so that when the loops come into contact with the lugs, the loops tend to splay out from the housing prior to springing back towards the housing so as to surround the lugs, once the lug has gone past the end of the loop. This holding by snap-fastening takes place after the adhesive has been put into place while positioning the housing elements to press one against the other in a position that corresponds to the closed position of the housing.

This holding by snap-fastening allows the operator to avoid any need to hold the assembled-together housing elements until the adhesive has set.

It should be recalled that the terms "comprise" or "comprising" do not exclude other elements or steps.

The invention claimed is:
1. A transmission comprising:
  a shaft made as a single piece or as at least two shaft sections on a common axis;
  a drive toothed wheel mounted to rotate freely on said shaft; and
  either a clutch mechanism arranged between the shaft and the drive toothed wheel when the shaft is made as a single piece, or else two clutch mechanisms arranged one between one section of the shaft and the drive toothed wheel, and the other between the other section of the shaft and the drive toothed wheel,
  wherein the clutch mechanism or each clutch mechanism is activated by driving the drive toothed wheel in rotation in a first forward rotary drive direction, and is deactivatable by driving the shaft or the shaft section with which it co-operates in rotation in the forward direction when the speed of rotation of the shaft or of said shaft section is greater than the speed of rotation of the drive toothed wheel,
  wherein the shaft or each shaft section in the deactivated state of the corresponding clutch mechanism is free to rotate in either direction of rotation,
  the clutch mechanism or each clutch mechanism having;
  a clutch plate mounted to rotate freely on the associated shaft or shaft section and to which the rotary motion of the drive toothed wheel is suitable for being transmitted; and a part carried by and constrained to rotate with the associated shaft or shaft section; and a brake of said clutch plate acting continuously on the angular speed of said plate;

wherein the brake of the, or of at least one of the, clutch plates is threaded on the shaft or on the shaft section carrying said plate, wherein the brake of the clutch plate, or of at least one of the clutch plates comprises two spring blades extending along the shaft or the shaft section carrying said clutch plate, and a connection zone for connecting said spring blades together, said connection zone arranged at or in the vicinity of one of the ends of the spring blades, being provided with a through orifice to enable said brake to be threaded on the shaft or the shaft section carrying said clutch plate.

2. A transmission according to claim 1, wherein the brake of the clutch plates, or of at least one of the, clutch plates is a friction brake member that is active by continuous bearing contact against the outer peripheral edge face of said clutch plate.

3. A transmission according to claim 1, wherein the brake of the clutch plate, or of at least one of the clutch plates is mounted fixed in rotation around the shaft or shaft section associated with said clutch plate.

4. A transmission according to claim 1, wherein the brake of the clutch plates, or of at least one of the clutch plates is generally U-shaped.

5. A transmission according to claim 1, wherein said spring blades of the brake of the clutch plate are mounted so as to be constrained to rotate about the shaft or the shaft section carrying said clutch plate, in diametrically opposite manner relative to the shaft or the shaft section carrying said clutch plate.

6. A transmission according to claim 5, wherein the shaft or the shaft sections, the drive toothed wheel, and each clutch mechanism are housed at least in part inside a housing, and in that the spring blades, in order to be mounted so as not to rotate, are bent back at their free ends so as to form tongues suitable for sliding in respective axial grooves of the housing.

7. A transmission according to claim 1, wherein the brake of the clutch plates, or of at least one of the, clutch plates is formed by a folded and cut sheet.

8. A transmission according to claim 1, wherein said clutch plate, arranged between the drive toothed wheel and the part is mounted to be axially movable towards and away from the drive toothed wheel and is arranged:

in the activated state of the clutch mechanism, to engage with the part that is carried by, and constrained to rotate with, the shaft or the shaft sections; and in the deactivated state, to be decoupled from the part that is carried by, and constrained to rotate with, the shaft or the shaft section.

9. A transmission according to claim 1, wherein the clutch plate, and the part of the clutch mechanism, or of at least one of the, clutch mechanisms, and the drive toothed wheel are each provided with ramps on at least one their faces, the ramps of one face of the plate co-operating, during the activation stage, with the ramps of one face of the drive toothed wheel to move the clutch plate axially in a first direction away from the drive wheel and to secure the clutch plate with the part that is carried by, and constrained to rotate with, the shaft or the shaft section, the ramps of the other face of the plate co-operating, during the deactivation state, with ramps of one face of the part that is carried by, and constrained to rotate with, the shaft or the shaft sections to cause the shaft or the shaft sections to freewheel by axially moving said clutch plate in the opposite direction.

10. A transmission according to claim 1, wherein the transmission has motor drive means for driving the drive toothed wheel, said motor drive means comprising a motor having a drive shaft, said drive shaft extending parallel to the longitudinal axis of the shaft or of each of the shaft sections.

11. A transmission according to claim 10, wherein the motor drive means further comprise a gear mechanism arranged between the drive shaft and the drive toothed wheel, the gear mechanism, with which the drive toothed wheel is permanently engaged by meshing, comprising a plurality of gears, each mounted to rotate about an axis extending parallel to the drive shaft and to the shaft or each of the shaft sections.

12. A transmission according to claim 11 in which the shaft, the drive toothed wheel, and each clutch mechanism are housed at least in part inside a housing, wherein the motor drive means for driving the toothed wheel in rotation comprise an epicyclic gear train, arranged between the gear mechanism and the drive shaft, the epicyclic gear train comprising a planet carrier to which the rotary motion of the drive shaft is suitable for being transmitted, the planet carrier of the epicyclic gear train being constrained to rotate with a gear of the gear mechanism, this gear and the planet carrier forming a rotary assembly that is carried and guided in rotation inside the housing by a mechanical bearing, the bearing comprising an inner ring inside which said assembly is housed at least in part, and an outer ring surrounding the inner ring, said inner and outer rings being coaxial and mounted free to rotate relative to each other, the outer ring being mounted stationary inside the housing.

13. A transmission according to claim 1, in which the shaft, the drive toothed wheel, and each clutch mechanism are housed at least in part inside a housing, wherein in the transmission, the housing presents at least two housing elements that can be assembled together via a junction plane, and in that the shaft or each of the shaft sections extends transversely, preferably orthogonally, relative to said junction plane when the housing elements are in the assembled state.

14. A transmission according to claim 13, wherein said housing, which presents at least two housing elements that can be assembled together via a junction plane and that, in the assembled state, define a cavity, includes both sealing means for sealing said cavity, which sealing means extend in the junction plane surrounding said cavity, and also holder means for holding the housing elements pressed one against the other by snap-fastening.

15. A self-propelled wheeled vehicle that requires a walking driver, is fitted with a transmission in accordance with claim 1, and in that the transmission shaft is a shaft for driving wheels of said vehicle.

* * * * *